Aug. 26, 1952 — J. E. WHITE — 2,608,596
BATTERY CASE AND TERMINAL POST CONSTRUCTION
Filed March 18, 1947 — 2 SHEETS—SHEET 1

INVENTOR
JOHN EDWARD WHITE
BY
Edward J. Dwyer
ATTORNEY

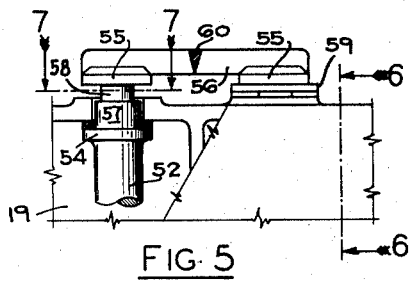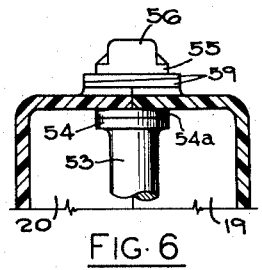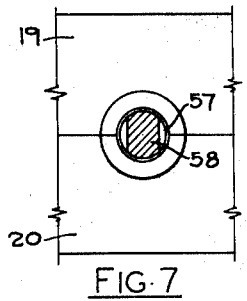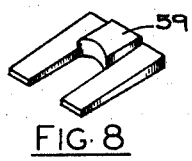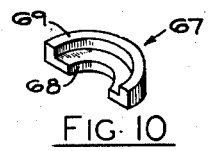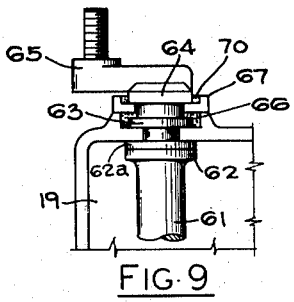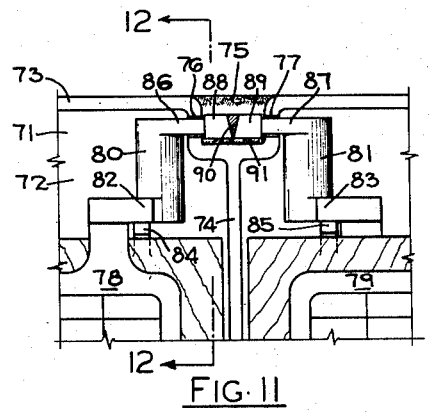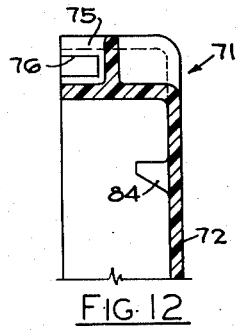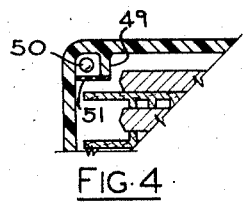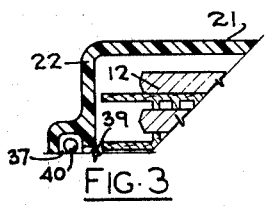

Patented Aug. 26, 1952

2,608,596

UNITED STATES PATENT OFFICE 2,608,596

BATTERY CASE AND TERMINAL POST CONSTRUCTION

John Edward White, Philadelphia, Pa., assignor to The Electric Storage Battery Company, a corporation of New Jersey Application March 18, 1947, Serial No. 735,363

12 Claims. (Cl. 136—166)

1

This invention relates to improvements in storage batteries and particularly to improvements in storage battery cases and terminal post constructions.

Objects of the invention are to provide improved storage battery cases in which both jar and cover are formed from two preferably identically molded, mating case halves, and to provide improved terminal post constructions particularly adapted for batteries having cases formed in such fashion.

Further objects of the invention are to provide improved battery cases formed by cementing together two sections of plastic material, the seam between the sections being impervious to electrolyte; to provide improved battery cases in which the need for separate jars and covers is eliminated, thereby reducing the number of different designs of parts needed; to provide improved and simplified methods of assembling storage batteries, and to provide improved battery case constructions in which cases enclosing a plurality of cells of any desired number may be formed from two mating case sections, preferably identically molded halves.

In accomplishing these and other objects of the present invention, I have provided improved details of structure, preferred forms of which are shown in the accompanying drawings, wherein:

Figure 3 is a horizontal sectional view illustrating a gravity indicator that may be employed in the battery, the view being taken substantially on the line 3—3 of Figure 1;

Figure 4 is a horizontal sectional view, similar to Figure 3, but showing a modified form of gravity indicator;

Figure 5 is a side elevational view of a portion of a battery showing a modified form of terminal post, post seal, and intercell connector, a portion of one of the case sections being broken away to clarify the illustration;

Figure 6 is a vertical sectional view taken substantially on the line 6—6 of Figure 5;

Figure 7 is a horizontal sectional view taken substantially on the line 7—7 of Figure 5;

Figure 8 is an enlarged perspective view of a

2 wedge employed in the post seal construction shown in Figures 5, 6 and 7;

Figure 9 is a side elevational view of a portion of a case section and terminal post showing a further modified form of post and post seal;

Figure 10 is an enlarged perspective view of a plastic collar half employed in the post seal of Figure 9;

Figure 11 is a side elevational view of a portion of a case section and intercell connector showing still another modified form of terminal post, post seal and intercell connector; and Figure 12 is a vertical sectional view taken substantially on the line 12—12 of Figure 11, the battery element being omitted.

Figure 1:
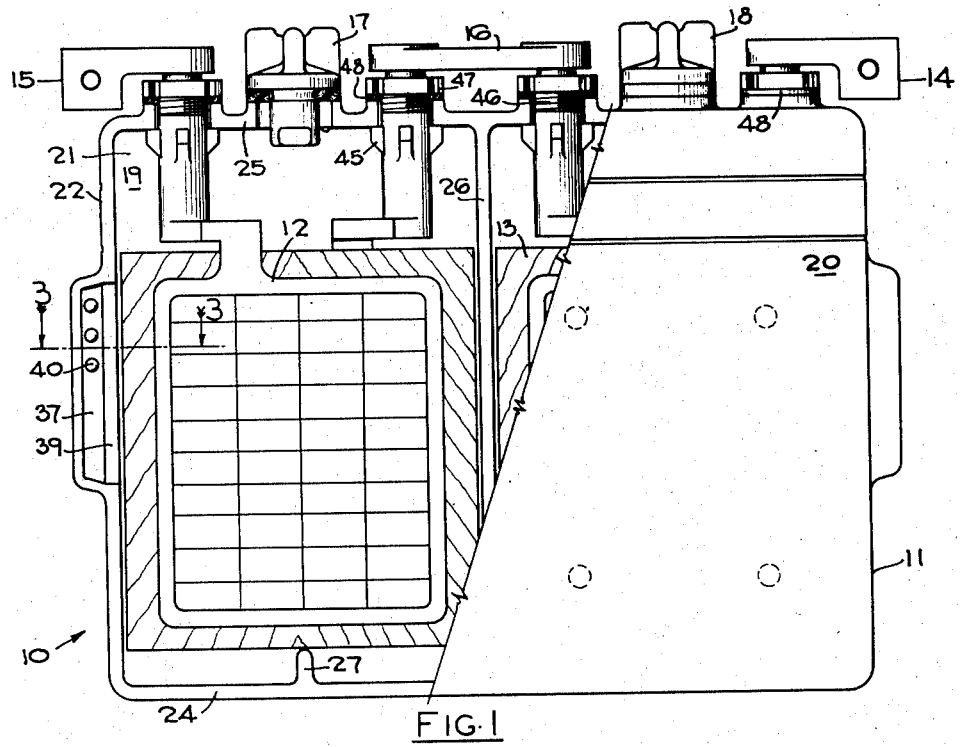
Figure 1 is a side elevational view of a storage battery constructed in accordance with the principles of the present invention, a portion of one of the case sections being broken away to clarify the illustration.
Figure 2:
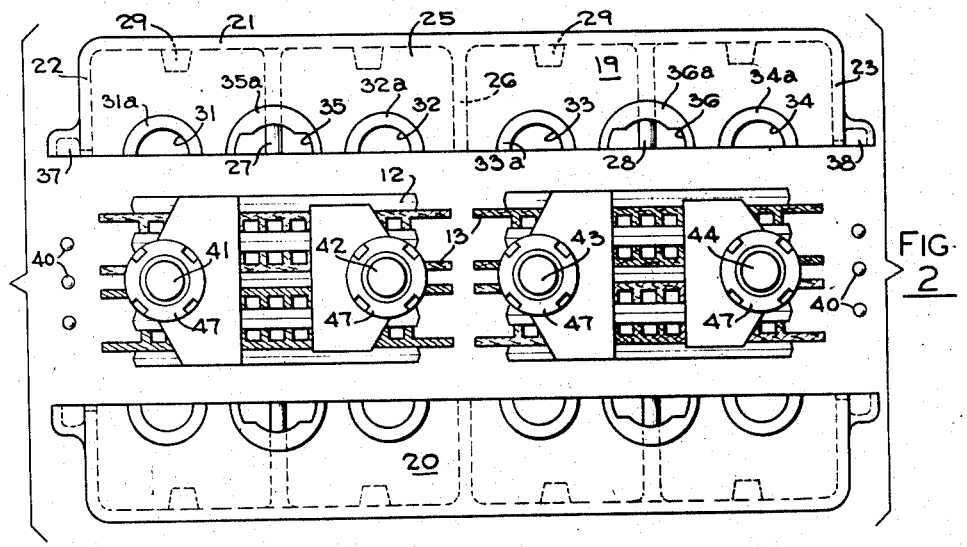
Figure 2 is an exploded top plan view of two battery case sections constructed in accordance with the present invention and two battery elements, illustrating the fashion in which the case sections and elements are assembled.

Referring more in detail to the drawings:

Figures 1 and 2 illustrate in detail a two cell storage battery in which the case and terminal posts are constructed in accordance with one form of the present invention. The battery, designated 10, comprises a case 11, assembled elements having the usual positive and negative plates 12 and separators 13, positive and negative terminals 14 and 15 respectively, intercell connector 16 and vent caps 17 and 18.

In accordance with the present invention, the case 11 is formed of two identically molded, mating case halves 19 and 20. The case halves are preferably molded from a synthetic resinous material that is chemically resistant to the electrolyte and capable of being cemented, as, for example, polystyrene, vinyl polymers or copolymers, polyethylene or methacrylates. In the construction shown the case halves are identical in all respects and only the case half 19 is described in detail; it is to be understood that the case half 20 has the same structural features.

The case half 19 includes a side wall 21, end wall halves 22 and 23, bottom half 24, cover half 25 and partition half 26, all molded integrally by any suitable molding process. Laterally extending separator or element supporting ribs 27 and 28 are upstanding from bottom 24, and element packing members 29 project from side wall 21, all molded integrally with the respective wall portions.

The inner edge of cover half 25 has four semi-circular recesses 31, 32, 33 and 34 for reception of terminal posts, and two additional recesses 35 and 36 formed as halves of threaded sockets, here illustrated as interrupted threads of the bayonet type. The recesses are positioned symmetrically with respect to the transverse vertical center plane of the case half so that when the open faces of two case halves are directed together, as in Figure 2, corresponding recesses register to form circular apertures or threaded sockets. Preferably surrounding recesses 31 to 36 in the cover half are upstanding flanges 31a to 36a respectively, each forming half of an annulus, as illustrated in Figure 2.

In the form illustrated the case half has vertically extending troughs 37 and 38 projecting outwardly from the inner edge of end walls 22 and 23 for reception of gravity indicators.

The edges of the end walls between the troughs and the case interior are recessed, as indicated at 39, to permit entrance of the electrolyte into the troughs (see Figures 1 and 3). The gravity indicating devices may conveniently be masses or shapes 40 of known specific gravity, the gravity of the shapes which float in the electrolyte indicating the gravity of the electrolyte in the manner known in the art.

As best shown in Figure 2, the first steps in assembling a battery in which the case is formed in accordance with the present invention are to insert assembled elements into one of the case halves, in this instance case half 20, and to insert gravity shapes 40 into the troughs of said case half. Appropriate cement, resistant to electrolyte, is then applied to the case halves at the edge faces that are to contact each other. A solution of the synthetic resin from which the case halves are made is suitable for such a cement. Case half 19 is then placed over the elements, and is secured to case half 20 by the adhesive action of the cement. By this cementing operation the seams between the case halves, both in the external walls of the case and in the partition between cells, are made impervious to electrolyte.

The separators are supported on ribs 27 and 28 in the construction shown, and the spaces at either side of said ribs furnish spaces into which sediment may drop. The plate groups are supported by suspension from the battery cover and the assembled elements are compressed by packing members 29. In other designs, the plates as well as separators may be supported on ribs located as 27 and 28.

The element on the left as viewed in Figure 2 has a negative terminal post 41 and positive terminal post 42, and the element on the right has a negative terminal post 43 and positive terminal post 44. The battery elements are not described in further detail since elements of any suitable type may be employed in batteries having case and terminal post constructions of the present invention. When the battery is assembled, posts 41, 42, 43 and 44 are received respectively in the apertures formed in the cover by the mating of semi-circular recesses 31, 32, 33 and 34 in case half 19 with corresponding recesses in case half 20.

The posts shown in Figures 1 and 2 have a plurality of integrally cast radial lugs 45 adapted to engage the under surface of the cover halves. Above the cover each post has a screw threaded section 46 which receives a nut 47, a washer 48 of resilient or compressible material being interposed between each nut 47 and the cover.

In assembling the battery, nuts 47 and washers 48 may be applied to the posts before assembly of the elements and case halves, as illustrated in Figure 2, and tightened after assembly, the flanges around the edges of the recesses being received between the washers and the tops of lugs 45. Otherwise, if it is more convenient, the nuts and washers may be applied after assembly of the elements and case halves.

After the battery has been assembled as described, battery terminals 14 and 15 are applied to posts 41 and 44 and intercell connector 16 to posts 42 and 43. The terminals and connector may be of any appropriate design and may be secured to the posts either before or after assembly of the elements and case halves by welding as "lead burning" or otherwise, as practiced in the art.

When the case halves are assembled, recesses 35 and 36 in case half 19 and the corresponding recesses in case half 20 form openings that furnish access to the interior of the cells. In the construction illustrated these openings receive vent plugs 17 and 18.

After assembly of the elements and case halves and application of the terminals and intercell connector, the battery is ready for reception of the electrolyte and formation or charging as now practiced in the art.

I have illustrated the improved case construction of the present invention employed in a two-cell battery, but it is obvious that the same case construction could be employed in batteries having any other number of cells as desired.

Figure 4 shows a modified form of gravity indicator in which each case half has a vertically extending rib 49 molded integrally with the interior of the side wall adjacent one vertical edge. The space between said rib and the end wall half forms a trough for reception of gravity shapes 50, which may be similar to the gravity shapes 40 previously described. Shapes 50 may be retained within the trough by a perforated plastic strip 51 cemented to rib 49 and covering the open face of the trough, but permitting passage of electrolyte thereinto.

The two case halves are molded identically in this modified construction. Hence the gravity indicating devices appear at diagonally opposite corners of the battery when the case halves are assembled with their open faces mating, and thus a gravity indicating device is furnished for each cell in a two-cell battery.

The modified form of gravity indicator does not add to the overall length of the battery. Therefore its use is advantageous in batteries for installations in which there is a length limitation.

Figures 5 to 8 show a modified form of terminal post and post seal in which flanges that fit both above and below the battery cover are cast integrally with the post. In these figures I have illustrated the post and seal applied to posts to which an intercell connector is attached, in which instance half portions of the connector are also cast integrally with the posts. It is obvious, however, that similarly constructed posts and post seals may be employed for posts that form battery terminals, in which instance terminals may be cast integrally with the posts.

The posts, designated 52 and 53, are similarly formed. Said posts include integrally cast flanges 54 that engage the under face of the cover halves, flanges 55 that fit above the cover halves, and connector means 56, which in the illustration are halves of intercell connectors. Between flanges 54 and 55 the shank of each post includes a cylindrical section 57 received within the cover recesses and a section 58 having flattened sides (Figure 7) to accommodate plastic sealing wedges 59 (Figure 8). A gasket 54a of resilient material such as, for example, soft rubber is interposed between flange 54 and the underside of the cover half.

As shown in Figure 8, the sealing wedges are bifurcated and the bifurcations taper outwardly.

The wedges are preferably employed in opposed pairs and are inserted between flanges 55 and the upper face of the cover, one from either side of the battery, after assembly of the elements and case halves. Preferably they are cemented in place by suitable cement, such cement being similar to that mentioned above as suitable for cementing the case halves together.

Either before or after assembly of the battery in the manner described, the two connector halves 56 are joined by welding, such as "lead burning" or otherwise, as indicated at 60.

Figures 9 and 10 show a modified form of terminal post and post seal in which provision is made for a grease cup surrounding the post, a feature that has been found advantageous in preventing creepage of electrolyte. Figure 9 illustrates a post that carries a battery terminal, but it is obvious that the same construction could be applied to posts to which an intercell connector is attached.

As shown in Figure 9, the battery element has a terminal post 61 on which are integrally cast a lower flange 62, an intermediate flange 63, an upper flange 64 and connector means 65, which in this illustration is a battery terminal. The cover halves fit between the upper face of lower flange 62 and the lower face of intermediate flange 63, a resilient gasket 62a being interposed between flange 62 and the underside of the cover. Flange 63 is surrounded by cement, indicated at 66.

Two plastic collar halves 67 are pieced together in abutting relation beneath upper flange 64 and are retained by cement 66 to form an annular collar surrounding said flange. The details of a collar half are illustrated in Figure 10. It is seen that said collar half includes a base portion 68 in the form of a half-annulus and an upstanding flange 69 around the outer periphery of said base portion.

When the collar halves are cemented in place, there is sufficient clearance between the outer periphery of flange 64 on the post and the inner face of flange 69 on the collar to provide space for reception of grease indicated at 70. The use of grease for preventing electrolyte creepage is known in the art and hence is not explained here.

Figures 11 and 12 show a modified construction in which the intercell connector is embedded in the battery cover. In this modification the recesses in the case halves are arranged somewhat differently than in the embodiments of the invention illustrated in Figures 1 to 10, but otherwise the case halves are similar to those of the embodiments already described.

Only one case half is illustrated in Figures 11 and 12 and is designated 71. It is to be understood that the other case half is identically molded and hence has the same structural features.

It mates with case half 71 and is connected thereto in the same fashion as case halves 19 and 20.

Case half 71 includes a side wall 72, cover half 73, partition half 74, and end wall halves and a bottom half, not shown, all molded integrally. The cover half contains a well 75 and the end walls of said well have recesses 76 and 77 for passage of the embedded intercell connector, hereinafter described.

The elements, designated 78 and 79, have terminal posts 80 and 81 which are offset from the connecting straps to form horizontal shoulders 82 and 83. Side walls 72 of the case half has inwardly projecting brace lugs 84 and 85 molded integrally therewith on which shoulders 82 and 83 of the posts rest to assist in supporting the elements within the case, or the elements may be supported by properly located ribs as 27 and 28 of Figure 1 and Figure 2.

Horizontal extensions 86 and 87 are cast integrally with terminal posts 80 and 81 and extend into well 75 through recesses 76 and 77. Half connectors 88 and 89 are cast integrally with said horizontal extensions. After assembly of the elements, the connector halves are joined by lead burning or otherwise as practiced in the are, the juncture being indicated at 90. After said connector halves are joined, the elements are assembled with the case halves. Well 75 is filled with sealing material, indicated at 91, to embed the connector in the battery cover. The sealing material is preferably non-rigid in order that it may yield and yet maintain intimate contact as the metal and plastic contract and expand at different rates in response to temperature changes. Rubber or asphalt compositions are examples of suitable materials. Preferably there is sufficient clearance between extensions 86 and 87 and the edges of recesses 76 and 77 so that the sealing material at least partially fills said recesses.

When the case and connector are constructed as illustrated in Figures 11 and 12, the battery terminals may follow any of the constructions previously described, or they may extend through the ends of the battery container in the same manner as connector halves 86 and 87 extend through the well walls.

The expression "identically molded," as employed herein, does not exclude parts on which are performed subsequent operations that destroy complete identicalism, as for example, a machining operation on one or both of the case sections. The expression "mating sections" is not limited to identically molded sections, but includes, for example, constructions in which one section is deeper than the other. The expression "connector means" is intended to include either a battery terminal or an intercell connector or portion thereof.

From the foregoing description it is seen that I have provided improved and simplified battery constructions in which battery cases are formed from identically molded mating case halves and I have also provided improved terminal post constructions particularly adapted for use with such battery cases. It is obvious, however, that these principles of construction shown may be applied to battery case sections which need not be of identical construction.

While I have shown but certain embodiments of the present invention, it is apparent that the structures may be further modified without departing from the spirit of the invention. Therefore I do not wish to be limited by the disclosure set forth, but only by the scope of the appended claims.

I claim:

1. In a storage battery, a case and at least one element, said case comprising two preformed mating case sections, said case sections including side walls, sections of end walls, sections of a bottom and sections of a cover, said case sections having edge recesses, said case sections being secured together at their juncture, thereby forming walls, a bottom and a cover enclosing said element, corresponding recesses in the case sections registering to form apertures through said case, said element having terminal means passing through certain of said apertures, another of said apertures furnishing access to the interior of the battery.

2. In a storage battery, a case and at least one element, said case comprising two preformed identically molded mating case halves, said case halves including integrally formed side walls, halves of end walls, halves of a bottom and halves of a cover, said case halves having edge recesses positioned symmetrically with respect to the transverse vertical center plane of the case halves, said case halves being secured together at their juncture, thereby forming walls, a bottom and a cover enclosing said element, corresponding recesses in the case halves registering to form apertures through said case, said element having terminal means passing through certain of said apertures, another of said apertures furnishing access to the interior of the battery.

3. In a storage battery, a case and a plurality of elements, said case comprising two preformed identically molded mating case halves, said case halves including integrally formed side walls, halves of end walls, halves of at least one partition, halves of a bottom and halves of a cover, said case halves having edge recesses positioned symmetrically with respect to the transverse vertical center plane of the case halves, said case halves being secured together at their juncture, thereby forming walls, at least one partition, a bottom and a cover enclosing said elements in separate cell compartments, corresponding recesses in the case halves registering to form apertures through said case, said elements having terminal means passing through certain of said apertures, intercell connectors joining certain of said terminal means, other of said terminal means forming battery terminals, other of said apertures furnishing access to the interior of the cell compartments.

4. In a storage battery, a case and at least one element, said case comprising two preformed mating case sections, said case sections including side walls, sections of end walls, sections of a bottom and sections of a cover, the cover sections having edge recesses, said case sections being secured together at their juncture, thereby forming walls, a bottom and a cover enclosing said element, corresponding recesses in the cover sections registering to form apertures through said cover, said element having terminal posts passing through certain of said apertures, another of said apertures furnishing access to the interior of the battery.

5. In a storage battery, a case and a plurality of elements, said case comprising two preformed identically molded mating case halves, said case halves including integrally formed side walls, halves of end walls, halves of at least one partition, halves of a bottom and halves of a cover, said cover halves having edge recesses positioned symmetrically with respect to the transverse vertical center plane of the case halves, said case halves being secured together at their juncture, thereby forming walls, at least one partition, a bottom and a cover enclosing said elements in separate cell compartments, corresponding recesses in the cover halves registering to form apertures through said cover, said elements having terminal posts passing through certain of said apertures, and intercell connectors joining certain of said terminal posts externally of said case, other of said terminal means forming battery terminals, other of said apertures furnishing access to the interior of the cell compartments.

6. In a storage battery, a case and a plurality of elements, said case comprising two preformed mating case halves, said case halves including side walls, halves of end walls, halves of at least one partition, halves of a bottom, halves of a cover and walls forming wells at the intersections of the partition halves and cover halves, the well walls and the cover halves having edge recesses, said case halves being secured together at their juncture, thereby forming walls, at least one partition, a bottom and a cover enclosing said elements in separate cell compartments, corresponding recesses in the well walls and cover halves registering to form apertures through said well walls and cover, said elements having terminal means passing through the apertures in said well walls, an intercell connector in said well joining said terminal means, and terminal means on two of said elements passing through apertures in said cover to form battery terminals, other of the apertures in said cover furnishing access to the interior of the cell compartments.

7. In a storage battery, a case and a plurality of elements, said case comprising two preformed identically molded case halves secured together at their juncture, thereby forming walls, at least one partition, a bottom and a cover enclosing said elements in separate cell compartments, said case having apertures at the juncture of said case halves, said element having terminal means passing through certain of said apertures, and an intercell connector joining certain of said terminal means, other of said terminal means forming battery terminals and other of said apertures furnishing access to the interior of the cell compartments.

8. In a storage battery, a case and at least one element, said case comprising two preformed identically molded case halves cemented together at their juncture, thereby forming walls, a bottom and a cover enclosing said element, gravity indicating means, and means in said case for housing said gravity indicating means.

9. In a storage battery, a case and at least one element, said case comprising two preformed identically molded case halves having edge recesses, said case halves being secured together at their juncture, thereby forming walls, a bottom and a cover enclosing said element, corresponding recesses in the case halves registering to form apertures through said case, said element having terminal means, at least certain of said terminal means having integrally formed spaced pairs of flanges, said terminal means being received in said apertures with the case edge between the flanges, and means sealing the outer flange to the exterior of the case edge, another of said apertures being adapted to furnish access to the interior of the battery.

10. In a storage battery, a case and at least one element, said case comprising two preformed mating case sections, said case sections including integrally molded side walls, sections of end walls, sections of a bottom, sections of a cover, and elements packing members projecting from said side walls, said case sections having edge recesses, said case sections being secured together at their juncture, thereby forming walls, a bottom and a cover enclosing said element, the element packing members compressing the plates and separators of the element, corresponding recesses in the case sections registering to form apertures through said case, said element having terminal means passing through certain of said apertures, another of said apertures furnishing access to the interior of the battery.

11. The method of assembling a storage battery comprising the steps of inserting an element sidewise into a preformed case half with the posts extending through edge recesses in the case half, applying cement to the edge faces of the case half, and enclosing the element by fitting a second preformed case half thereover.

12. In a storage battery including a plurality of elements and a case enclosing said elements, an intercell connector construction comprising posts connected to said elements and having horizontal extensions, said case being formed of preformed mating sections secured together and having a well in the cover portion at the division between cells, the walls of said well having edge recesses through which said horizontal extensions pass, connector means in said well joining said extensions, and non-rigid sealing material in said well, covering said connector means.

JOHN EDWARD WHITE.

REFERENCES CITED

The following references are of record in the file of this patent:

UNITED STATES PATENTS

| Number | Name | Date |
|---|---|---|
| 271,732 | Nezeraux | Feb. 6, 1883 |
| 848,996 | Kaufmann | Apr. 2, 1907 |
| 1,125,321 | Hodge | Jan. 19, 1915 |
| 1,350,561 | Noble et al. | Aug. 24, 1920 |
| 1,355,396 | Hawkins | Oct. 12, 1920 |
| 1,513,913 | Kinsley | Nov. 4, 1924 |
| 1,712,897 | Morrison | May 14, 1929 |
| 1,843,109 | Colliflower | Feb. 2, 1932 |
| 1,858,383 | Anderson | May 17, 1932 |
| 1,888,890 | Sandman | Nov. 22, 1932 |
| 1,988,111 | Dunzweiler | Jan. 15, 1935 |
| 2,049,200 | Dunzweiler et al. | July 28, 1936 |
| 2,151,654 | Fitzgerald | Mar. 21, 1939 |
| 2,232,415 | Talbot et al. | Feb. 18, 1941 |
| 2,261,109 | Dunzweiler | Nov. 4, 1941 |
| 2,409,841 | Donkin | Oct. 22, 1946 |

FOREIGN PATENTS

| Number | Country | Date |
|---|---|---|
| 25,410 | Great Britain | Nov. 10, 1906 |
| 233,104 | Great Britain | May 7, 1925 |
| 310,568 | Germany | Dec. 29, 1914 |
| 428,484 | France | July 1, 1911 |
| 540,591 | Great Britain | Oct. 22, 1941 |

OTHER REFERENCES

Modern Plastics, December 1942, page 101 relied on.

Modern Industry, February 15, 1945, page 40.